(12) United States Patent
Takahashi et al.

(10) Patent No.: US 10,994,304 B2
(45) Date of Patent: May 4, 2021

(54) VIBRATION DEVICE, WEARABLE TERMINAL AND INCOMING CALL NOTIFICATION DEVICE

(71) Applicants: Yuki Takahashi, Tokyo (JP); Chikara Sekiguchi, Tokyo (JP); Tomoya Ishitani, Tokyo (JP); Shigenori Inamoto, Tokyo (JP)

(72) Inventors: Yuki Takahashi, Tokyo (JP); Chikara Sekiguchi, Tokyo (JP); Tomoya Ishitani, Tokyo (JP); Shigenori Inamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/481,198

(22) PCT Filed: Jan. 25, 2018

(86) PCT No.: PCT/JP2018/002298
§ 371 (c)(1),
(2) Date: Jul. 26, 2019

(87) PCT Pub. No.: WO2018/139542
PCT Pub. Date: Aug. 2, 2018

(65) Prior Publication Data
US 2020/0001326 A1    Jan. 2, 2020

(30) Foreign Application Priority Data
Jan. 27, 2017    (JP) .............................. JP2017-013600

(51) Int. Cl.
*B06B 1/04*    (2006.01)
*H04M 1/02*    (2006.01)
(Continued)

(52) U.S. Cl.
CPC ................. *B06B 1/04* (2013.01); *H04M 1/02* (2013.01); *H04M 19/04* (2013.01); *H02K 33/16* (2013.01)

(58) Field of Classification Search
CPC ... B06B 1/04; G06F 3/01; G06F 3/016; G06F 2203/013; H02K 33/16; H02K 33/00;
(Continued)

(56) References Cited

U.S. PATENT DOCUMENTS

| | | | |
|---|---|---|---|
| 2011/0101796 A1 | 5/2011 | Odajima et al. | |
| 2012/0232780 A1* | 9/2012 | Delson | A63F 13/803 701/400 |

(Continued)

FOREIGN PATENT DOCUMENTS

| | | |
|---|---|---|
| JP | 4875133 A | 5/2011 |
| JP | 2011183374 A | 9/2011 |

(Continued)

OTHER PUBLICATIONS

International Search Report from International Application No. PCT/JP2018/002298 dated May 1, 2018.

*Primary Examiner* — Omeed Alizada
(74) *Attorney, Agent, or Firm* — Brundidge & Stanger, P.C.

(57) ABSTRACT

A vibration apparatus, which is provided with vibration actuators with which a moving body elastically supported on a fixed body can be vibrated linearly with respect to the fixed body at a resonance frequency, has a mounting case in which multiple vibration actuators are mounted. The multiple vibration actuators oscillate at roughly the same resonance frequency, and in a manner such that the respective oscillation axis lines along the oscillation directions of the moving bodies are parallel to each other and that the center of gravity of the mounting case is interposed between the oscillation axis lines, the vibration actuators are disposed in (Continued)

orientations according to which the actuators excite oscillations in mutually opposite directions on the respective oscillation axis lines.

11 Claims, 13 Drawing Sheets

(51) Int. Cl.
*H04M 19/04* (2006.01)
*H02K 33/16* (2006.01)

(58) Field of Classification Search
CPC ........ H04M 19/04; H04M 1/02; H04M 1/026; H04M 1/72519
See application file for complete search history.

(56) References Cited

U.S. PATENT DOCUMENTS

| | | | |
|---|---|---|---|
| 2015/0137627 A1 | 5/2015 | Katada et al. | |
| 2017/0254662 A1 | 9/2017 | Takenaka et al. | |
| 2018/0369865 A1* | 12/2018 | Shoji | A63F 13/285 |

FOREIGN PATENT DOCUMENTS

| | | |
|---|---|---|
| JP | 4875133 B2 | 12/2011 |
| JP | 2015095943 A | 5/2015 |
| JP | 2015112013 A | 6/2015 |
| WO | 2016031118 A1 | 3/2016 |
| WO | 2017115729 A1 | 6/2017 |
| WO | 2017115729 A1 | 7/2017 |

* cited by examiner

VIBRATION DEVICE, WEARABLE TERMINAL AND INCOMING CALL NOTIFICATION DEVICE

TECHNICAL FIELD

The present invention relates to a vibration apparatus, a wearable terminal, and an incoming call notification device.

BACKGROUND ART

Conventionally, a linear vibration actuator that is mounted in a personal digital assistant such as a mobile phone and vibrates to inform a user of an incoming call or the like, or is mounted in a touch panel or a game device such as a controller of a game machine and vibrates to transmit operational feeling and/or realism of a game to a finger, hand, foot, and/or the like is known (see e.g., Patent Literatures (hereinafter, referred to as "PTLs") 1 to 3).

A vibration actuator disclosed in PTL 1 is formed into a platelike shape to achieve miniaturization. The vibration actuator of PTL 1 has the platelike shape in which a movable body with a supported shaft is slidably supported by the shaft.

A vibration actuator disclosed in PTL 2 includes: a stator including a housing and a coil; and a mover including a magnet and a weight part which are disposed in the housing, in which the mover being slidable with respect to a shaft vibrates linearly in a vibration direction with respect to the stator by cooperation between the coil and the magnet. The coil is wound around on the outside of a movable part including the magnet.

In addition, PTL 3 describes an actuator using a principle of a Voice Coil Motor (VCM) including flat coils disposed opposite and flat magnets disposed above the flat coils.

CITATION LIST

Patent Literature

PTL 1
Japanese Patent Application Laid-Open No. 2015-095943
PTL 2
Japanese Patent Application Laid-Open No. 2015-112013
PTL 3
Japanese Patent No. 4875133

SUMMARY OF INVENTION

Technical Problem

Meanwhile, there has been a demand for transmitting vibrations reliably to an apparatus in which any of the linear vibration actuators as described above is mounted.

Since a vibration arising in the vibration actuator depends on the mass and a stroke of the movable part, the vibration actuator itself needs to be enlarged in size in order to obtain a sufficient vibration in the vibration actuator.

However, an increase in size of the vibration actuator accordingly makes it necessary to enlarge the housing in which the vibration actuator is mounted, causing a problem in that the size of the housing for which miniaturization is to be achieved is restricted.

An object of the present invention is to provide a vibration apparatus, a wearable terminal, and an incoming call notification device which can preferably give a greater physically-felt vibration without enlarging a vibration actuator.

Solution to Problem

One aspect of a vibration apparatus of the present invention includes a configuration in which the vibration apparatus includes a vibration actuator that is capable of linearly vibrating a movable body supported elastically by a fixing body, the movable body being linearly vibrated with respect to the fixing body at a resonance frequency. The vibration apparatus includes a mounting housing in which a plurality of the vibration actuators are mounted. The plurality of vibration actuators vibrate at a substantially identical resonance frequency, and are disposed such that vibration-axial lines extending along vibration directions of a plurality of the movable bodies of the plurality of vibration actuators are parallel to each other and are arranged on opposite sides of a center of gravity of the mounting housing, the plurality of vibration actuators being disposed in such directions that vibrations are excited in mutually opposite directions along the vibration-axial lines.

One aspect of a wearable terminal of the present invention includes a configuration in which the wearable terminal includes the vibration apparatus of the aforementioned configuration, and the mounting housing is a main body housing. Moreover, an incoming call notification device of the present invention includes a configuration in which the incoming call notification device includes the vibration apparatus of the aforementioned configuration, and the mounting housing is a main body housing.

Advantageous Effects of Invention

According to the present invention, it is possible to give a greater physically-felt vibration preferably without enlarging the vibration actuator.

DESCRIPTION OF EMBODIMENTS

Hereinafter, embodiments of the invention will be described in detail with reference to the accompanying drawings.

Embodiment 1

[Entire Configuration of Vibration Apparatus]

Figure 1:
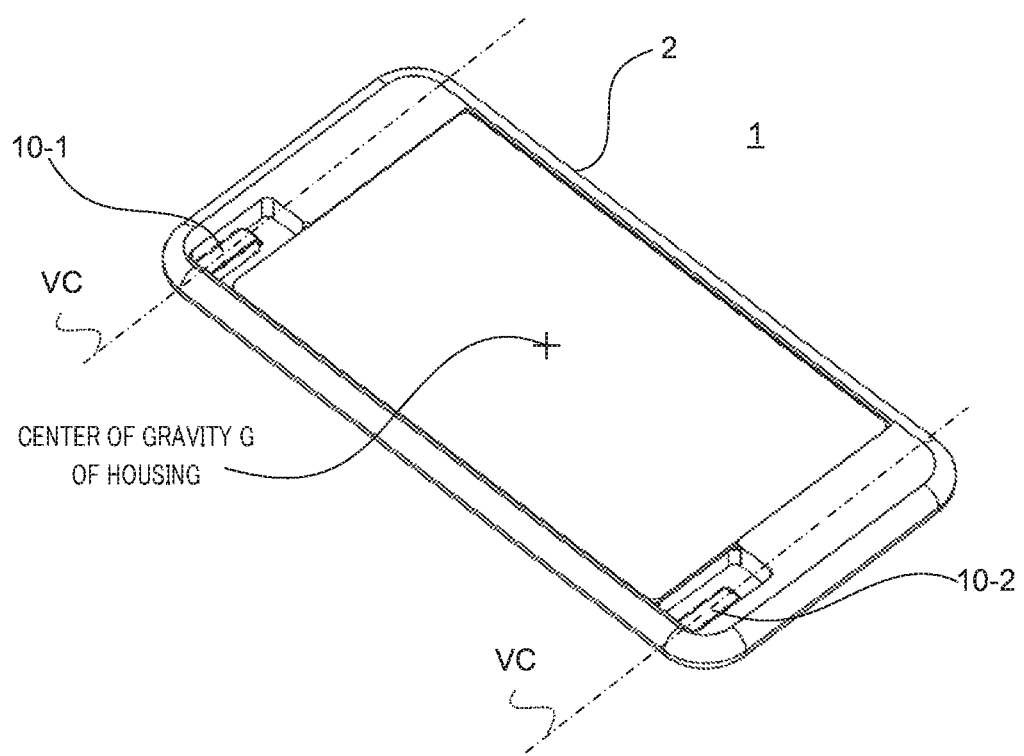
FIG. 1 is a perspective view illustrating a configuration of principal parts of a vibration apparatus of Embodiment 1 according to the present invention.

FIG. 1 is a plan view illustrating a vibration apparatus of Embodiment 1 according to the present invention.

Vibration apparatus 1 of Embodiment 1 of the present invention is applied to a mobile terminal, and includes housing 2 of the mobile terminal and a plurality of vibration actuators 10 (10-1 and 10-2) mounted in housing 2. Although Embodiment 1 of the present invention will be described in relation to vibration apparatus 1 applied to the mobile terminal, vibration apparatus 1 may also be applied to any kind of apparatus or device as long as it produces a vibration. For example, vibration apparatus 1 may be applied to a game controller, wearable terminal, laptop PC, tablet terminal, or the like. Note that, only disposition portions of housing 2 of the mobile terminal at which the vibration actuators 10 are disposed are illustrated in FIG. 1 to be seen through the outer surface of the housing of the mobile terminal, for convenience.

Vibration actuators 10-1 and 10-2 are disposed in housing 2 on opposite sides of center of gravity G of housing 2 and in such directions that vibrations are excited in opposite directions with respect to the identical axial direction (in antiphase).

It is preferable that center of gravity G of housing 2 be the center of gravity of housing 2 in which all components including vibration actuators 10-1 and 10-2 are included.

Vibration actuators 10-1 and 10-2 are so-called Linear Resonant Actuators (LRAs) or the like that cause their movable bodies to linearly move (reciprocate) at a substantially identical resonance frequency.

Figure 10:
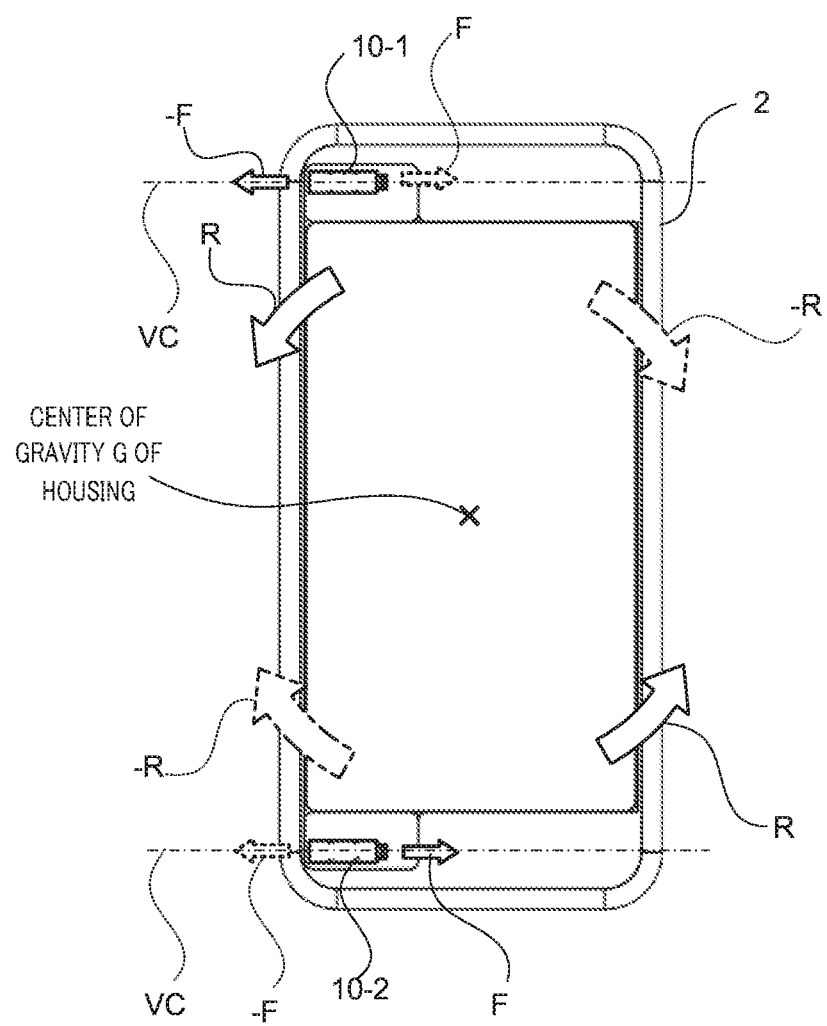
FIG. 10 is a plan view illustrating operation of the vibration apparatus.

In the present embodiment, vibration actuators 10-1 and 10-2 are vibration actuators 10 of the same configuration, and are disposed in housing 2 on opposite sides of center of gravity G such that their vibration directions are parallel to each other (are identical to each other) and the reciprocating directions of the movable bodies are opposite each other (such that vibration actuators 10-1 and 10-2 are driven in antiphase with each other) (see FIGS. 1 and 10). Vibration actuators 10-1 and 10-2 are disposed such that vibration-axial lines (imaginary lines serving as axial lines of the vibration directions of the movable bodies) VC extending along the vibration directions of the movable bodies of vibration actuators 10-1 and 10-2 are parallel to each other and are arranged on opposite sides of center of gravity G of housing 2, and are disposed in such directions that vibrations are excited in mutually opposite directions along their vibration-axial lines VC. Disposing on opposite sides of the center of gravity can also be rephrased as disposing such that center of gravity G of housing 2 as seen from one outer surface side of housing 2 is located between vibration actuators 10-1 and 10-2 in housing 2 in which vibration actuators 10-1 and 10-2 are disposed.

It can also be said that vibration actuators 10-1 and 10-2 vibrate at the substantially identical resonance frequency, and are disposed with center of gravity G being located between planes including vibration-axial lines VC extending along the vibration directions of movable bodies 30 (see FIG. 2) of vibration actuators 10-1 and 10-2 and in such directions that vibrations are excited in the mutually opposite directions (in antiphase with each other) along their vibration-axial lines VC (see FIG. 1).

Although vibration actuators 10-1 and 10-2 are disposed at the upper left side and at the lower left side in housing 2, the present invention is not limited to this, and vibration actuators 10-1 and 10-2 may also be disposed at any positions such as at the upper right side and at the lower right side in housing 2, at the upper right side and at the lower left side in housing 2, at the upper left side and at the lower right side in housing 2, or the like.

[Configuration of Vibration Actuator 10]

Each of vibration actuators 10 includes: a fixing body including a coil or a magnet; and a movable body including the other one of the coil and the magnet and being supported elastically by the fixing body. Vibration actuator 10 drives, by cooperation between the coil and the magnet, the movable body such that the movable body linearly reciprocates with respect to the fixing body at a resonance frequency.

Although vibration actuators 10 may have any configuration, the present embodiment will be specifically described by way of an example in relation to similar vibration actuators 10 with reference to FIGS. 2 to 7.

Figure 2:
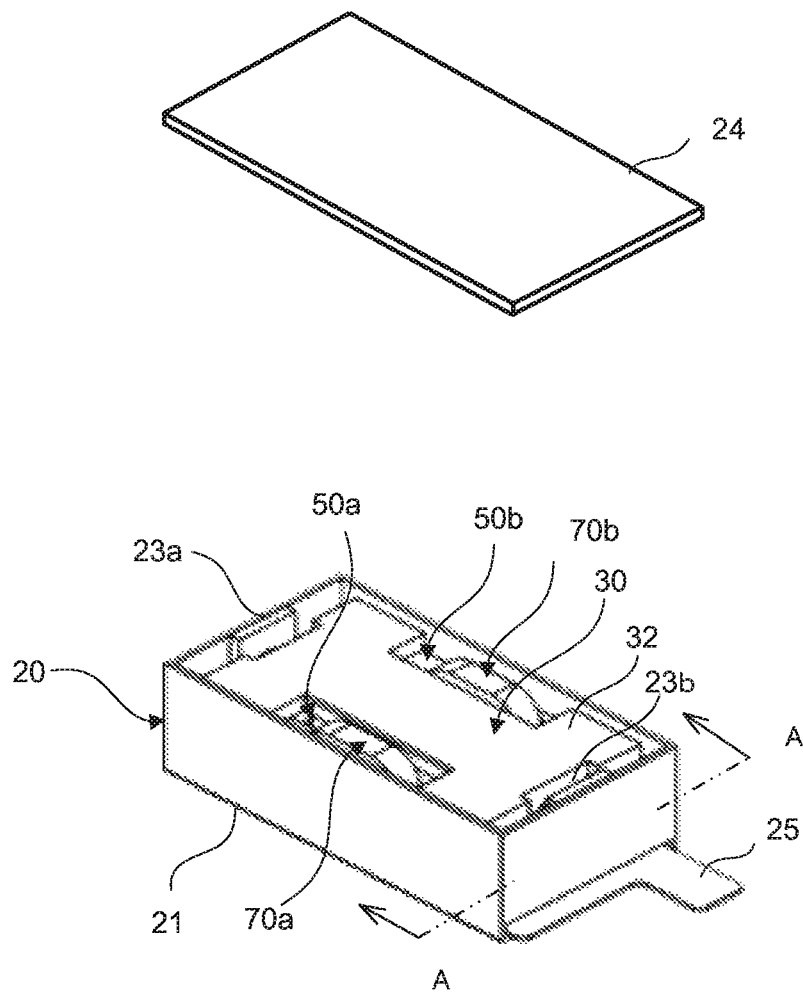
FIG. 2 is a perspective view illustrating an internal configuration of a vibration actuator as an example included by the vibration apparatus of Embodiment 1 according to the present invention.
Figure 3:
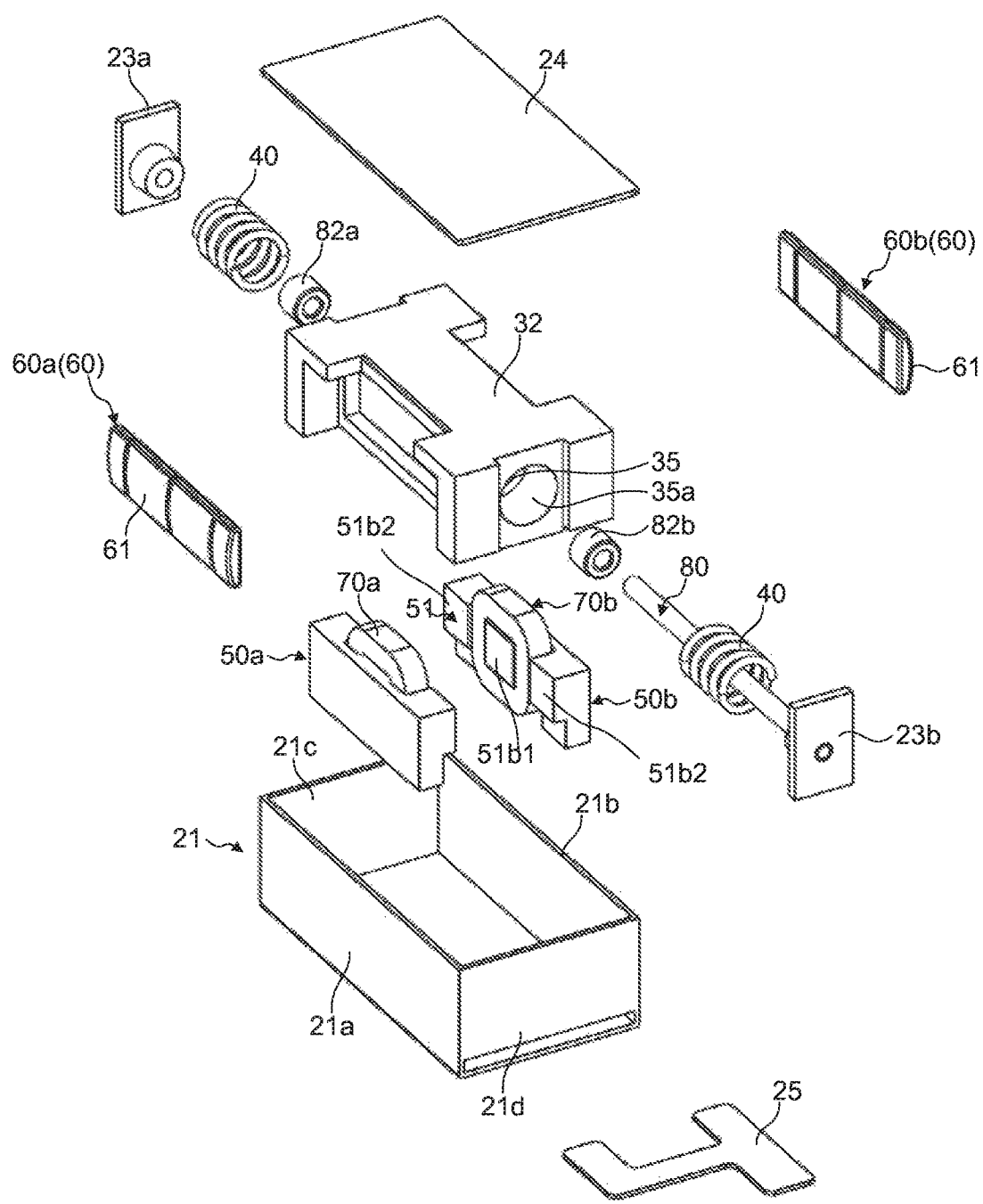
FIG. 3 is an exploded perspective view of the vibration actuator as seen from above.
Figure 4:
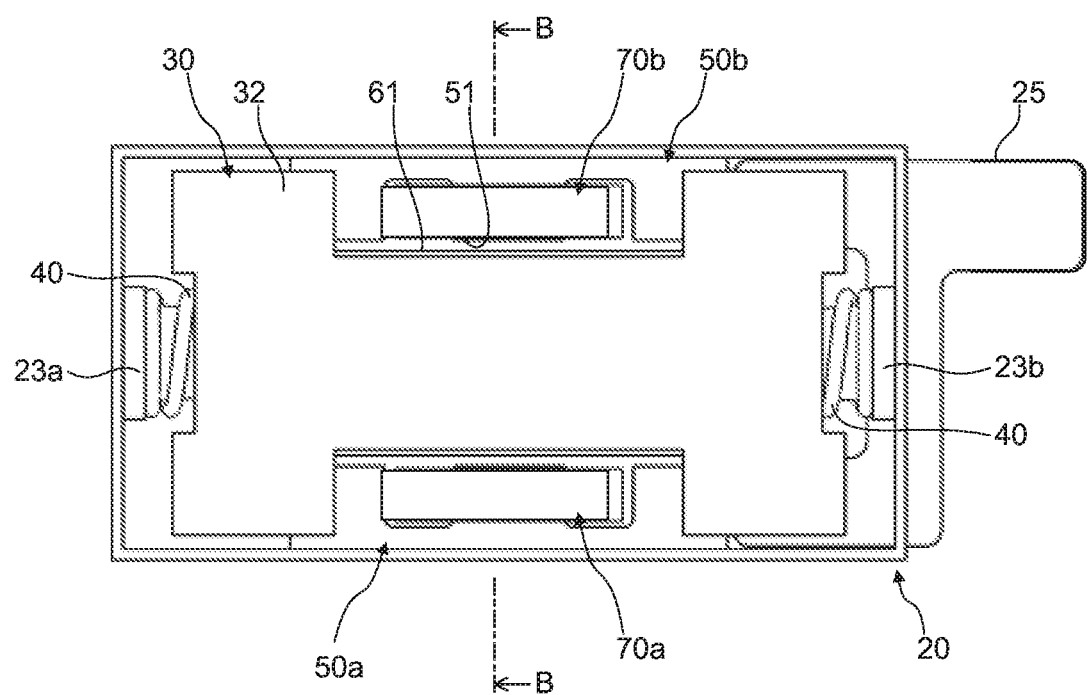
FIG. 4 is a plan view illustrating the internal configuration of the vibration actuator.
Figure 5:
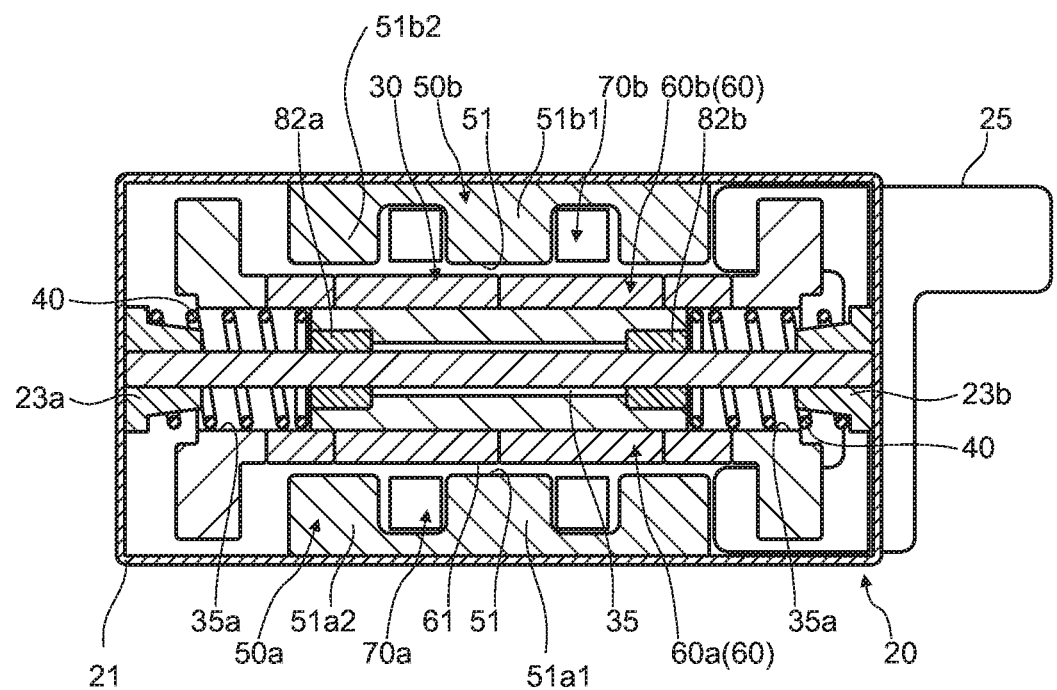
FIG. 5 is a sectional view taken along line A-A and seen in the direction indicated by the arrows in FIG. 2.
Figure 6:
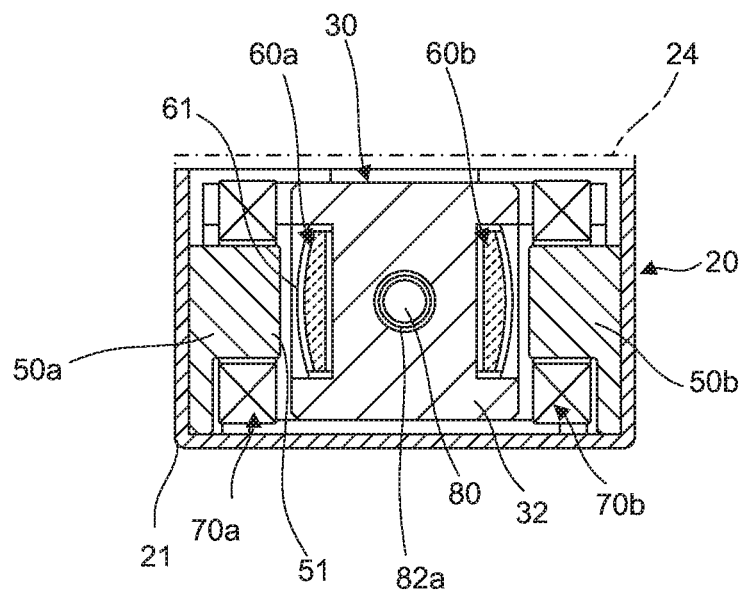
FIG. 6 is a sectional view taken along line B-B and seen in the direction indicated by the arrows in FIG. 4.
Figure 7:
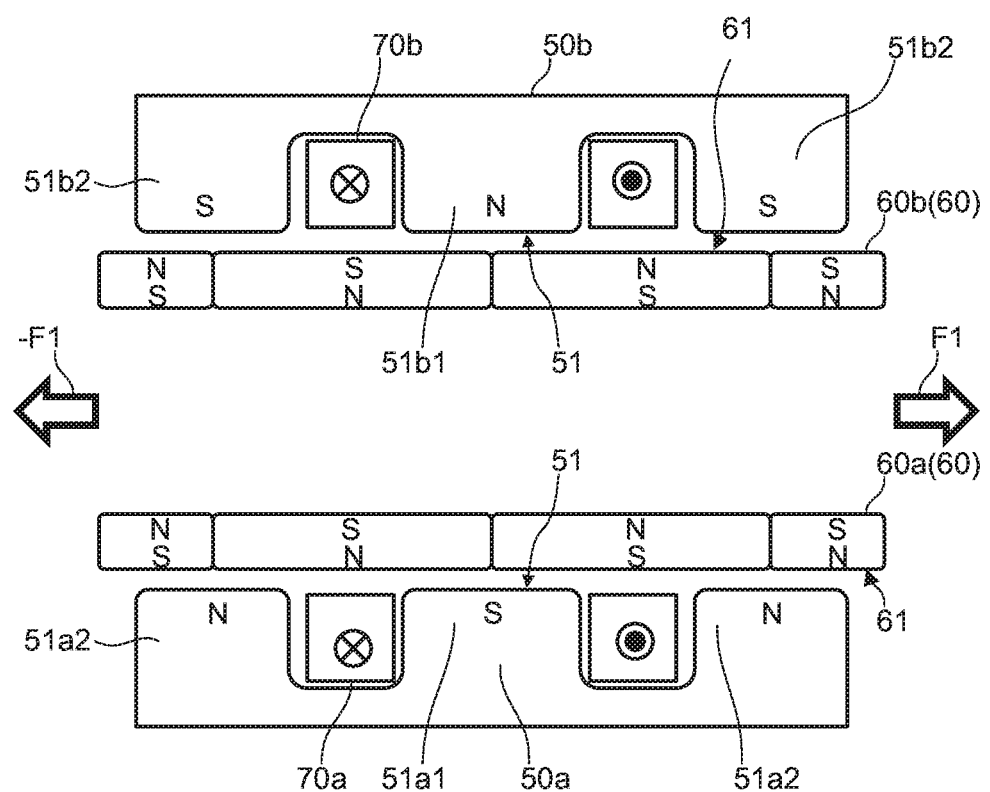
FIG. 7 schematically illustrates a magnetic circuit of the vibration actuator.

FIG. 2 is a perspective view illustrating the internal configuration of a vibration actuator as one example included in the vibration apparatus of Embodiment 1 according to the present invention, and FIG. 3 is an exploded perspective view of the vibration actuator as seen from above. In addition, FIG. 4 is a plan view illustrating the internal configuration of the vibration actuator, FIG. 5 is a sectional view of the vibration actuator taken along line A-A and seen in the direction indicated by the arrows in FIG. 2, and FIG. 6 is a sectional view of the vibration actuator taken along line B-B and seen in the direction indicated by the arrows in FIG. 4. In addition, FIG. 7 is a schematic plan view of a magnetic circuit of the vibration actuator. Note that, descriptions will be given with reference to FIGS. 1 to 7 in which the vibration direction of the movable body of vibration actuator 10 is also referred to as the front-rear direction, for convenience, and two directions orthogonal to the vibration direction are respectively referred to as the lateral direction (left-right direction) and the height direction (upper-lower direction or thickness direction).

Vibration actuator 10 illustrated in FIG. 2 has the shape of a flat plate whose height (which is the length in the upper-lower direction and corresponds to the thickness in the drawings) is smaller than the width (in the left-right direction in the drawings).

Vibration actuator 10 of the present embodiment includes fixing body 20, shaft part 80, and movable body 30 supported via shaft part 80 to be movable with respect to fixing body 20.

Movable body 30 reciprocates (or vibrates) along the axial direction of shaft part 80 (vibration direction of vibration apparatus 1 indicated by arrows F and –F in FIGS. 7 and 10) by cooperation between magnets 60 and cores (hereinafter, also referred to as "E-shaped cores") 50a and 50b around which coils 70a and 70b are wound.

Vibration actuator 10 includes magnets 60a and 60b disposed in movable body 30 at opposite side portions along the axial direction in such a manner as to sandwich the axis of shaft part 80, and cores 50a and 50b including protrusions (magnetic pole portions) 51a1 and 51b1 around which coils 70a and 70b are wound are disposed at positions where cores 50a and 50b face each other via magnets 60a and 60b and an air gap. Magnets 60a and 60b and E-shaped cores 50a and 50b around which coils 70a and 70b are wound are disposed such that their pole faces (pole faces for E-shaped cores 50a and 50b) 61 and 51 face each other.

Pole faces 61 of magnets 60a and 60b are disposed to face outward in a direction orthogonal to the axis of shaft part 80, and the magnetized faces of E-shaped cores 50a and 50b face pole faces 61. Composed of magnets 60a and 60b and cores 50a and 50b around which coils 70a and 70b are wound, a magnetic force generating part functions as a magnetic spring using magnetic attraction forces at the both sides of shaft part 80. Accordingly, movable body 30 is elastically supported to be movable in the axial direction in a state where rotation around the axis is prevented. The magnetic attraction forces are generated on both sides of shaft part 80 (the axis of shaft part 80) symmetrically with respect to shaft part 80 (the axis of shaft part 80). Movable body 30 is attracted toward both lateral sides by the magnetic attraction forces generated on the both lateral sides and the magnetic attraction forces are canceled out to be balanced, so that movable body 30 is prevented from being rotated and held at a position where movable body 30 is horizontal and that serves as a reference position. In addition to the magnetic spring, vibration actuator 10 includes metal springs 40 for elastically supporting for returnability at the time of axial movements.

In vibration actuator 10, movable body 30 includes bearings 82a and 82b for fixing shaft part 80 to fixing body 20 and in which shaft part 80 is inserted.

Fixing body 20 includes: case 21; spring holders 23a and 23b; coils 70a and 70b; E-shaped cores 50a and 50b which include thereon a plurality of protrusions delimited by slits formed in one surfaces of rectangular parallelepiped cores and on which coils 70a and 70b are disposed through the slits; and power supplying part 25. In fixing body 20, an opening in the top of case 21 is covered by cover 24.

Movable body 30 includes a pair of magnets 60a and 60b in which a plurality of magnetic poles (four poles in the present embodiment) are disposed alternately in the longitudinal direction, and movable-body main body 32 to which magnets 60a and 60b and bearings 82a and 82b are fixed. Movable body 30 is elastically supported by metal springs 40. Metal springs 40 are cylindrical coil springs, for example.

In vibration actuator 10, movable body 30 (magnets 60a and 60b, movable-body main body 32, and bearings 82a and 82b) is elastically supported by restoring forces of metal springs 40 in the axial direction and by the magnetic springs using the magnetic attraction forces generated by magnets 60a and 60b and E-shaped cores 50a and 50b around which coils 70a and 70b are wound.

<Fixing Body 20 of Vibration Actuator 10>

Case 21 is formed in a rectangular boxlike shape having a bottom surface portion, in which E-shaped cores 50a and 50b are disposed to respectively face the opposite lateral walls extending in the longitudinal direction. Shaft part 80 is also disposed in case 21 between opposite end walls 21c and 21d that close gaps between both ends of opposite lateral walls 21a and 21b.

Shaft part 80 is disposed along the longitudinal direction of case 21 and in the middle along the width direction of case 21. Shaft part 80 is fixed to opposite end walls 21c and 21d via spring holders 23a and 23b at the both ends of shaft part 80 in a state where shaft part 80 is inserted in bearings 82a and 82b of movable body 30. Accordingly, shaft part 80 is supported by opposite end walls 21c and 21d. Shaft part 80 is press-fit in fixing holes of spring holders 23a and 23b or inserted in the fixing holes and then fixed, e.g., adhesively, so as to be fixed to end walls 21c and 21d. Note that, bearings 82a and 82b are parts in which shaft part 80 is slidably inserted, and may be copper-based oilless bearings, iron-based oilless bearings, or iron-copper-based oilless bearings, or may also be magnetic materials. Metal springs 40 are fit to the outside of shaft part 80, with movable body 30 including bearings 82a and 82b being interposed between metal springs 40 in the longitudinal direction. Metal springs 40 restores, via bearings 82a and 82b, movable body 30 disposed on shaft part 80 to a middle portion in the longitudinal direction. Note that, case 21 forms a hollow electromagnetic shield with cover 24 attached to case 21.

E-shaped cores 50a and 50b are magnetic materials, and are formed respectively in the same shapes symmetrical with respect to the axis of shaft part 80. E-shaped cores 50a and 50b are formed in the E shape in plan view, and respectively include a plurality of protrusions 51a (51a1, 51a2) and 51b (51b1, 51b2) whose tip-end surfaces are pole faces 51. A plurality of protrusions 51a and 51b of E-shaped cores 50a and 50b are disposed such that their one side surfaces are aligned in the extending direction of their one side surfaces. Note that, pole faces 51 are parallel to shaft part 80 and to opposite lateral walls 21a and 21b of case 21, and it is preferable that pole faces 51 be disposed parallel to pole faces 61 of magnets 60a and 60b. Note that, E-shaped cores 50a and 50b may be formed of electromagnetic stainless steel, a sintering material, a Metal Injection Molding (MIM) material, a laminated steel plate, an electrolytic zinc-coated steel sheet (SECC), or the like.

In E-shaped cores 50a and 50b, coils 70a and 70b are wound only around central protrusions 51a1 and 51b1 of the protrusions 51a and 51b of E-shaped cores 50a and 50b. Coils 70a and 70b are wound around central protrusions 51a1 and 51b1 at pole faces 51 facing pole faces 61 of magnets 60a and 60b, and coils 70a and 70b are thus disposed to surround the pole faces that are the tip-end surfaces of central protrusions 51a1 and 51b1.

Coils 70a and 70b are composed of copper wires or the like, for example, and are connected to power supplying part 25. When coils 70a and 70b are excited by electric currents flowing through coils 70a and 70b, protrusions 51a2 and 51b2 on both sides of central protrusions 51a1 and 51b1 of E-shaped cores 50a and 50b are excited with a polarity opposite the polarity of central protrusions 51a1 and 51b1. Note that, it is preferable that protrusions 51a of E-shaped core 50a and protrusions 51b of E-shaped core 50b facing each other be excited with polarities different between E-shaped core 50*a* and E-shaped core 50*b*. With the mutually different polarities, the magnetic circuit configuration in vibration actuator 10 is more efficient.

Power supplying part 25 is a substrate for supplying electric power to coils 70*a* and 70*b*, and is composed of a substrate connected to an external power source, such as Flexible Printed Circuits (FPC) or the like. Power supplying part 25 is connected to coils 70*a* and 70*b* in case 21.

<Movable Body 30 of Vibration Actuator 10>

Movable body 30 is disposed in case 21 of fixing body 20 to be movable in the extending direction of shaft part 80 as illustrated in FIGS. 2 to 6. Movable body 30 includes movable-body main body 32, magnets 60*a* and 60*b*, and bearings 82*a* and 82*b*.

Bearings 82*a* and 82*b* in which inserted shaft part 80 is inserted, and magnets 60*a* and 60*b* disposed to sandwich therebetween shaft part 80 inserted via bearings 82*a* and 82*b* are integrally attached to movable-body main body 32.

Movable-body main body 32 functions as a weight of movable body 30, and it is preferable that metallic materials whose specific gravities are five or greater (e.g., iron such as the SECC, alloys mainly based on iron, bronze, copper, and the like), sintering materials, and Metal Injection Molding (MIM) materials are employed for movable-body main body 32. High specific gravity metallic materials (whose specific gravities are preferably 10 or greater, in particular, 11 or greater), such as tungsten or a tungsten alloy, are preferable for movable-body main body 32, for example. Movable-body main body 32 is formed of tungsten. For example, the standard values of specific gravity are as follows: SECC: 7.8, Nd-sintered magnet: 7.4 to 7.6, copper: 8.9, and tungsten: 16 to 19.

Movable-body main body 32 as seen in plan view is formed in the H shape of a rectangular parallelepiped from which middle portions of its both side surfaces extending along the longitudinal direction of case 21 are cut off. That is, movable-body main body 32 has the H shape of the rectangular parallelepiped trunk and front and rear projecting portions projecting out in the vibration direction at the both ends of the trunk in the vibration direction. Magnets 60*a* and 60*b* are disposed on depressed bottom surface portions of the H shape (that is, on the both side surfaces of the trunk extending along the axial direction) of movable-body main body 32.

E-shaped cores 50*a* and 50*b* are disposed in the depressions of movable body 30 with gaps therebetween within case 21, resulting in a configuration in which miniaturization is achieved by reducing gaps in case 21 as seen in plan view as much as possible.

Bearings 82*a* and 82*b* are parts in which shaft part 80 is inserted, and are formed from sintered sleeve bearings, for example. Bearings 82*a* and 82*b* are disposed on movable-body main body 32 such that shaft part 80 is located along the central axis of movable-body main body 32. Specifically, bearings 82*a* and 82*b* are coaxially fixed respectively to the both ends of through hole 35 passing through movable-body main body 32 along its central axis. Through hole 35 continuously extends between counterbore portions 35*a* formed respectively in the central portions of the both end surfaces (the tip-end surface of the front projecting portion and the rear end surface of the rear projecting portion) of movable-body main body 32 distant from each other in the axial direction of movable-body main body 32. One ends of metal springs 40 are inserted respectively in counterbore portions 35*a*, and metal springs 40 are locked at the bottom surfaces of the counterbore portions, respectively. Additionally, movable-body main body 32 is elastically supported via metal springs 40. Accordingly, movable body 30 is restored to the central position in the longitudinal direction within case 21 (fixing body 20) not only by the function of the magnetic spring but also by metal springs 40 when electric power is not supplied to coils 70*a* and 70*b*.

Magnets 60*a* and 60*b* include pole faces 61 as a plurality of magnetic poles, and are disposed in such a manner as to sandwich shaft part 80 and such that their magnetic poles 61 face away from each other. Specifically, magnets 60*a* and 60*b* are fixed to the both side surfaces of movable-body main body 32 extending along the longitudinal direction of movable-body main body 32 in which shaft part 80 is inserted, in a state where magnets 60*a* and 60*b* are parallel to shaft part 80 and pole faces 61 face toward opposite sides.

Pole faces 61 respectively have four different magnetic poles alternating along the extending direction of shaft part 80 as illustrated in FIGS. 3, 5, and 7. Moreover, pole faces 61 of magnets 60*a* and 60*b* facing each other are disposed to have magnetic poles different between magnet 60*a* and magnet 60*b* in the direction orthogonal to shaft part 80 (see FIG. 7). That is, magnets 60*a* and 60*b* are disposed to face the pole faces of E-shaped cores 50*a* and 50*b*, respectively, and are disposed such that the mutually different polarities alternate in the longitudinal direction (axial center direction) of case 21. Note that, magnets 60*a* and 60*b* may be composed of a plurality of alternating magnets (magnet pieces) of different polarities, or may also be magnets which are magnetized to have alternately different magnetic properties. The same applies to magnets in each embodiment described below. Note that, magnets 60*a* and 60*b* may be formed of Nd-sintered magnets or the like, for example.

Pole faces 61 are disposed parallel to pole faces 51 of E-shaped cores 50*a* and 50*b* while facing these pole faces 51 with predetermined air gaps being interposed between pole faces 61 and pole faces 51.

Pole faces 61 of magnets 60*a* and 60*b* are formed such that central portions of pole faces 61 in the height direction are curved surfaces or trapezoidal central protrusions which are the closest to pole faces 51 which pole faces 61 face as illustrated in FIGS. 3, 6, and the like. Accordingly, a force (torque) for stopping movable body 30 against a rotational direction of movable body 30 acts on movable body 30 to stop it in the middle in the rotational direction. This force causes movable body 30 to be substantially horizontally situated in the middle around the axis in the rotational direction, so that movable body 30 is never attracted on the side of one of E-shaped cores 50*a* and 50*b* sandwiching movable body 30, and is disposed so as not to be rotated and inclined around shaft part 80 (that is, movable body 30 is disposed to be in a substantially horizontal and stable state). As understood, movable body 30 is brought into the stable state, so that it is possible to prevent movable body 30 from coming into contact with stationary fixing body 20 (i.e., it is possible to prevent interference between parts). Note that, even when movable body 30 rotates, it becomes less likely for magnets 60*a* and 60*b* to come into contact with pole faces 51 of E-shaped cores 50*a* and 50*b*. This relationship between pole faces 61 and pole faces 51 maximizes an area that pole faces 61 and pole faces 51 face each other in a limited space within case 21, thereby achieving higher output by virtue of efficient concentration of magnetic fluxes at the time when the magnetic circuit is driven.

Since E-shaped cores 50*a* and 50*b* that are magnetic materials are disposed in case 21 to respectively face magnets 60*a* and 60*b* disposed to sandwich shaft part 80, magnetic attraction forces arise between E-shaped cores 50*a* and 50b and magnets 60a and 60b. Since the magnetic attraction forces arise on opposite sides of shaft part 80 along a single straight line and in opposite directions away from each other, the magnetic attraction forces are canceled out. These magnetic attraction forces prevent inclination of movable body 30 that would rotate around shaft part 80, so that movable body 30 is brought into a state of being positioned (positioning of the movable body) and the rotation of movable body 30 around shaft part 80 is restricted (so-called detent).

E-shaped cores 50a and 50b are excited by electric current supplied to coils 70a and 70b from power supplying part 25, so that pole faces 51 at the tip ends of protrusions 51a and 51b are magnetized and have magnetic poles, and a thrust is generated according to the relationship with the magnetic poles of magnets 60a and 60b disposed to face pole faces 51. Movable body 30 including magnets 60a and 60b reciprocates (vibrates back and forth) in the longitudinal direction that is the axial direction (or the vibration direction) by changing the direction of the electric current supplied to coils 70a and 70b.

For example, the polarities (pole faces 61) of magnet 60a are disposed in the order of the S pole, N pole, S pole, and N pole from the front side to the back side, and those polarities are aligned in the longitudinal direction to face pole faces 51 of core 50a as illustrated in FIG. 7. In addition, the polarities (pole faces 61) of magnet 60b are disposed in the order of the N pole, S pole, N pole, and S pole from the front side to the back side, and those polarities are aligned in the longitudinal direction to face pole faces 51 of core 50b. That is, as for the number of poles of magnets 60a and 60b and the number of poles of E-shaped cores 50a and 50b facing the poles of magnets 60a and 60b in vibration actuator 10, the ratio between the poles of the magnets and the poles of the E-shaped cores is 4:3. In addition, with shaft part 80 being interposed therebetween, magnets 60a and 60b are disposed such that their pole faces have polarities opposite those of pole faces 51 of E-shaped cores 50a and 50b which magnets 60a and 60b respectively face.

In addition, coils 70a and 70b are supplied with electric current to excite E-shaped cores 50a and 50b, so that the polarity of central protrusion 51a1 of E-shaped core 50a facing magnet 60a becomes the S pole and the polarity of central protrusion 51b1 of E-shaped core 50b facing magnet 60b becomes the N pole. Accordingly, the polarities of protrusions 51a2 and 51b2 located on the both sides of central protrusions 51a1 and 51b1 such that central protrusions 51a1 and 51b1 of E-shaped cores 50a and 50b are interposed between protrusions 51a2 and 51b2, respectively, are different from the polarities of central protrusions 51a1 and 51b1, respectively (see FIG. 7).

Thus, the magnetic attraction forces cause a thrust in the F1 direction, so that cores 50a and 50b are driven in the F1 direction. In addition, coils 70a and 70b are supplied with reverse electric current and the polarities of E-shaped cores 50a and 50b are reversed; that is, the polarity of central protrusion 51a1 of E-shaped core 50a facing magnet 60a is caused to be the N pole and the polarity of central protrusion 51b1 of E-shaped core 50b facing magnet 60b is caused to be the S pole. Accordingly, protrusions 51a2 located on the both sides of central protrusion 51a1 of E-shaped core 50a is magnetized such that their polarity becomes the S pole, and sandwiching protrusions 51b2 located on the both sides of central protrusion 51b1 of E-shaped core 50b facing magnet 60b is magnetized such that their polarity becomes the S pole. Movable body 30 including magnets 60a and 60b facing those E-shaped cores is then driven in the −F1 direction that is opposite the F1 direction.

That is, in vibration actuator 10, alternating current waves input to coils 70a and 70b from power supplying part 25 magnetize pole faces 51 (or the tip-end surfaces of protrusions 51a and 51b in detail) of E-shaped cores 50a and 50b, so that the magnetic attraction forces and repulsion forces are effectively generated with respect to magnets 60a and 60b on the sides of movable body 30. Accordingly, magnets 60a and 60b of movable body 30 reciprocate in opposite directions F (in the F1 direction and the −F1 direction) along the longitudinal direction with reference to a position that is a drive reference position (here, a position where the longitudinal (axial) center of magnet 60a as seen toward its planar surface overlaps the center of opposing pole face 51 and the center of magnet 60a in the height direction overlaps the center of opposing pole face 51 in the height direction). That is, movable body 30 vibrates back and forth with respect to fixing body 20 in a direction along pole faces 61 of magnets 60a and 60b and along pole faces 51 of E-shaped cores 50a and 50b.

In vibration actuator 10, movable body 30 vibrates with respect to fixing body 20 at resonance frequency $f_r$ [Hz] computed by following Equation 1 in which m [kg] denotes the mass of movable body 30 and $K_{sp}$ denotes the spring constant in the torsional direction.

[1]

$$f_r = \frac{1}{2\pi}\sqrt{\frac{K_{sp}}{M}} \qquad \text{(Equation 1)}$$

In vibration actuator 10, power supplying part 25 supplies coils 70a and 70b with an alternating current of a frequency that is substantially equal to resonance frequency $f_r$ of movable body 30, so as to excite E-shaped cores 50a and 50b (in particular, one end surfaces thereof which serve as pole faces 51) via coils 70a and 70b. Thus, it is possible to drive movable body 30 efficiently.

Movable body 30 of vibration actuator 10 in the present invention is in a state of being supported by a spring-mass structure in which the movable body is to be supported by fixing body 20 via the magnetic spring by E-shaped cores 50a and 50b around which coils 70a and 70b are wound and magnets 60a and 60b, and via metal springs 40. Therefore, when coils 70a and 70b are supplied with the alternating current of the frequency equal to resonance frequency $f_r$ of movable body 30, movable body 30 is resonantly driven.

The equation of motion and the circuit equation representing the driving principle of vibration actuator 10 are shown below. Vibration actuator 10 is driven based on the equation of motion represented by following Equation 2 and on the circuit equation represented by following Equation 3.

[2]

$$m\frac{d^2x(t)}{dt^2} = K_f i(t) - K_{sp}x(t) - D\frac{dx(t)}{dt} \qquad \text{(Equation 2)}$$

m: Mass [Kg]
x(t): Displacement [m]
$K_f$: Thrust constant [N/A]
i(t): current [A]
$K_{sp}$: spring constant [N/m]

D: damping coefficient [N/(m/s)]

[3]

$$e(t) = Ri(t) + L\frac{di(t)}{dt} + K_e \frac{dx(t)}{dt} \quad \text{(Equation 3)}$$

e(t): Voltage [V]
R: Resistance [Ω]
L: Inductance [H]
$K_e$: Counter electromotive force constant [V/(m/s)]

That is, mass m [Kg], displacement x(t) [m], thrust constant $K_f$ [N/A], current i(t) [A], spring constant $K_{sp}$ [N/m], damping coefficient D [N/(m/s)], and the like in vibration actuator 10 may be changed appropriately as long as Equation 2 is satisfied. Voltage e(t) [V], resistance R [Ω], inductance L [H], and counter electromotive force constant $K_e$ [V/(m/s)] may also be changed appropriately as long as Equation 3 is satisfied.

It is thus possible to efficiently obtain a greater output in vibration actuator 10 when vibration actuator 10 is driven at resonance frequency $f_r$ determined by mass m of movable body 30 and by spring constant $K_{sp}$ resulting from superimposition of metal springs (elastic bodies, coil springs) 40 and the magnetic springs.

Driving back and forth in the F and −F directions at a substantial resonance frequency (the resonance frequency or frequency X that is slightly lower than the resonance frequency and that is approximate to the resonance frequency (see FIG. 11)) in vibration actuator 10 serves as vibrations of vibration actuators 10-1 and 10-2 in the mobile terminal as vibration apparatus 1.

Note that, among the magnetic attraction forces arising between coils 70a and 70b (E-shaped cores 50a and 50b) and magnets 60a and 60b on the both sides of shaft part 80, normal reactions that act on movable body 30 to generate a frictional force arise in mutually opposite directions with respect to shaft part 80 in vibration actuator 10. Accordingly, the normal reactions are mutually canceled out and reduced, so that it is possible to maintain the function of the magnetic springs for driving movable body 30 in the vibration direction of movable body 30 by the magnetic attraction forces and the function of detent for movable body 30, so as to achieve vibration actuator 10 that can be miniaturized and vibrate preferably efficiently.

Figure 8:
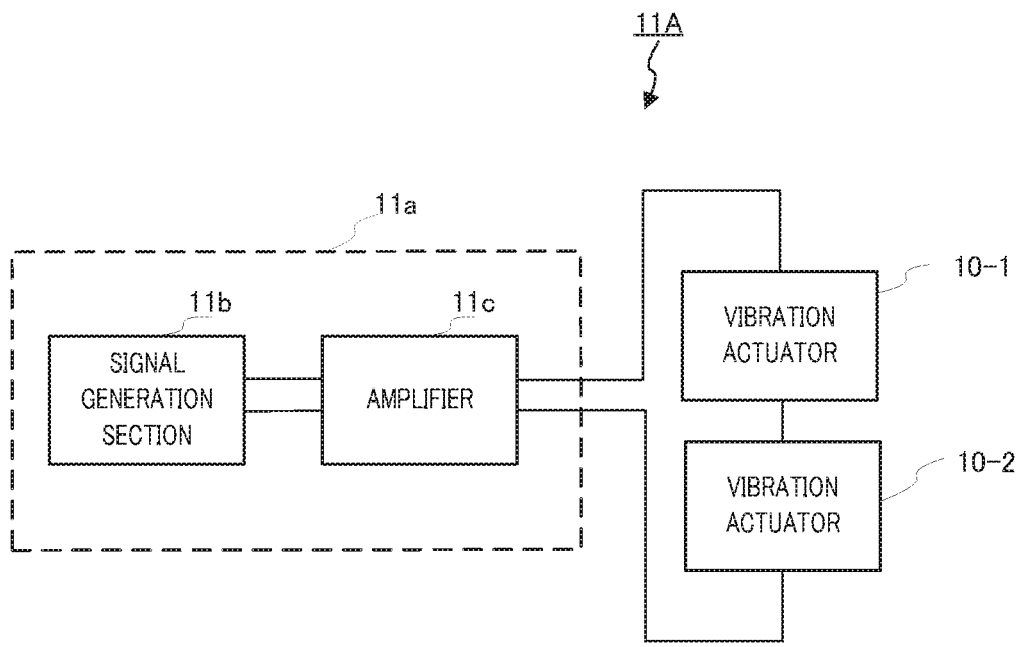
FIG. 8 is a functional block diagram of the vibration apparatus.

FIG. 8 is a functional block diagram of vibration apparatus 1.

Vibration actuators 10-1 and 10-2 in vibration apparatus 1 are driven by means of a driving circuit system that vibration apparatus 1 has, for example. Vibration actuators 10-1 and 10-2 are connected in series to signal generation section 11b and amplifier 11c of drive control section 11a in driving circuit system 11A. Signal generation section 11b generates a driving signal and outputs it to amplifier 11c when a vibration generation command signal such as a signal for notifying incoming call or the like is input from a control section (not illustrated) or a communication section (not illustrated) included in the mobile terminal. The driving signal is output to vibration actuators 10-1 and 10-2 via amplifier 11c, and vibration actuators 10-1 and 10-2 are driven based on the driving signal input from drive control section 11a. At this time, drive control section 11a generates and outputs the driving signal such that movable bodies 30 driven by cooperation between coils 70a and 70b and magnets 60a and 60b in vibration actuators 10-1 and 10-2 reciprocate at the identical frequency and in antiphase with each other.

Figure 9:
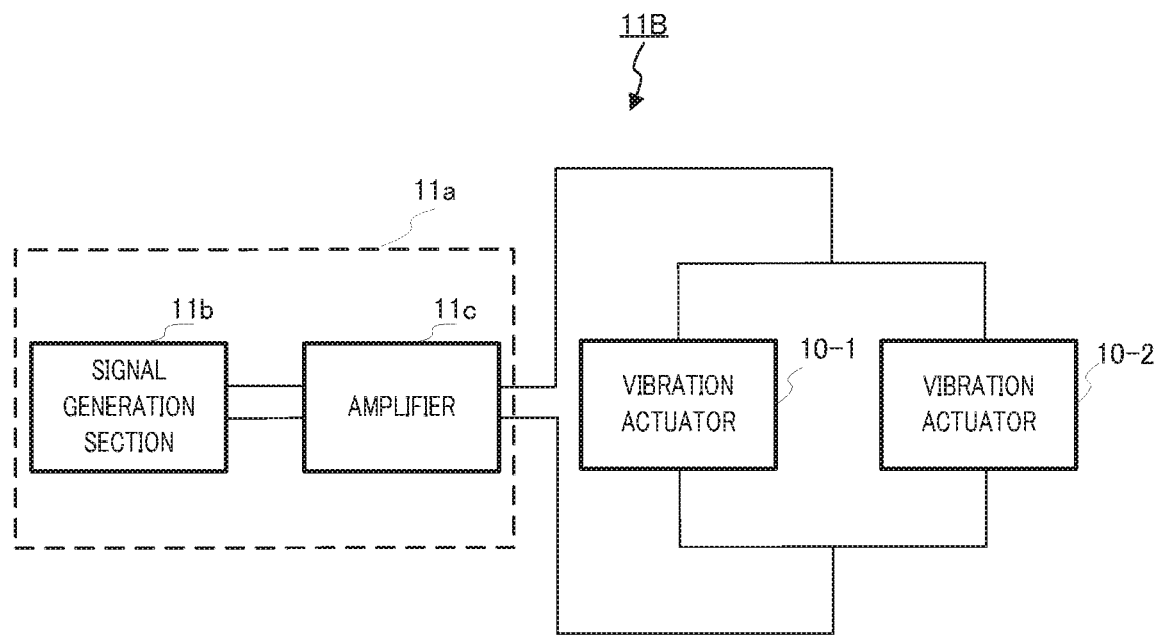
FIG. 9 illustrates a variation of the functional block diagram of the vibration apparatus.

Alternatively or additionally, vibration actuators 10-1 and 10-2 may be connected in parallel to drive control section 11a, and may be driven such that the movable bodies of vibration actuators 10-1 and 10-2 reciprocate at the identical frequency and in antiphase with each other in vibration apparatus 1 as illustrated in driving circuit system 11B of FIG. 9.

In driving circuit system 11B illustrated in FIG. 9, a plurality of vibration actuators 10-1 and 10-2 are driven in antiphase with each other.

[Operation of Vibration Apparatus 1]

FIG. 10 is a plan view illustrating operation of the vibration apparatus. Note that, only disposition portions of housing 2 of the mobile terminal at which the vibration actuators 10 are disposed are illustrated in FIG. 10 to be seen through the outer surface of the housing of the mobile terminal, for convenience.

In vibration apparatus 1, vibrations are excited in the mutually opposite directions along the vibration-axial lines (shaft parts 80) of movable bodies 30 (see FIG. 2), for example, via driving circuit systems 11A or 11B of a plurality of vibration actuators 10-1 and 10-2 as illustrated in FIG. 8 or 9. Thus, vibration actuator 10-1 vibrates in the −F direction (e.g., such a vibration corresponds to the movement of movable body 30 in the −F direction as illustrated in FIG. 7), and vibration actuator 10-2 vibrates in the F direction (e.g., such a vibration corresponds to the movement of movable body 30 in the F direction as illustrated in FIG. 7). Accordingly, a motion of housing 2 itself of moving (vibrating) on one side in the circumferential direction (in the direction indicated by solid-line arrows R) around center of gravity G of housing 2 arises, and housing 2 moves in the direction indicated by arrows R.

When coils 70a and 70b of vibration actuators 10-1 and 10-2 are supplied with reverse electric current via signal generation section 11b and amplifier 11c of drive control section 11a illustrated in FIG. 8 or 9, vibrations in the opposite directions are excited in movable bodies 30 (see FIG. 2) and vibration actuators 10-1 and 10-2 vibrate in the mutually opposite directions as described above. That is, vibration actuator 10-1 moves in the F direction and vibration actuator 10-2 moves in the −F direction. Accordingly, a motion of housing 2 itself of moving (vibrating) on the other side in the circumferential direction (in the direction indicated by dashed-line arrows −R) around center of gravity G of housing 2 arises as illustrated in FIG. 10, and housing 2 moves in the direction indicated by arrows −R. Repetition of these motions causes entire housing 2 of vibration apparatus 1 to reciprocate (vibrate) in the circumferential direction around center of gravity G.

According to the present embodiment, by disposing a plurality of vibration actuators (linear resonant actuators) which can be miniaturized, it is possible to obtain a sufficient vibration, it is not necessary to enlarge the vibration actuators in order to achieve a higher output, and it is also possible to alleviate restrictions on the design of housing 2. Specifically, the vibration actuators can be disposed even in a small space between other parts in housing 2, and it is not necessary to secure a large space for a vibration actuator with a great output.

Moreover, according to vibration apparatus 1, vibration actuators 10-1 and 10-2 are connected in series or in parallel, and are respectively driven at a substantially identical resonance frequency in drive circuits (driving circuit system 11A and driving circuit system 11B) for driving vibration actuators 10-1 and 10-2.

Here, the substantially identical resonance frequency means a resonance frequency or frequency X that is lower than the resonance frequency (e.g., a frequency that satisfies $f_r(=M)-10<X \leq f_r(=M)$).

Figure 11:
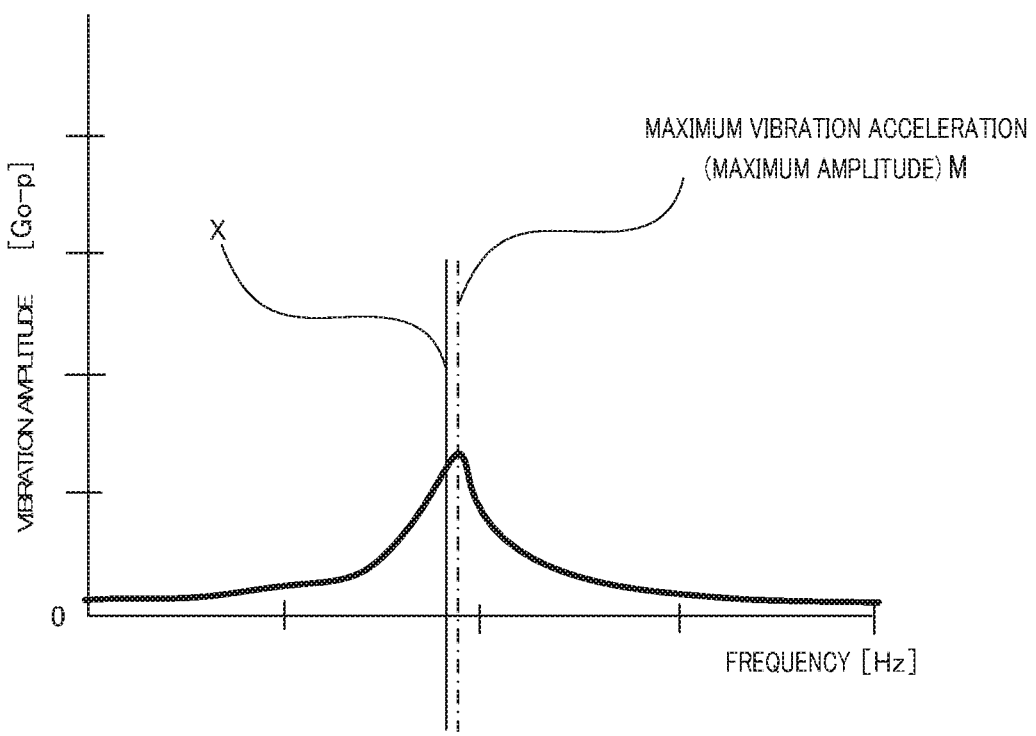
FIG. 11 illustrates a relationship between a driving frequency and an amplitude of the vibration actuator.
Figure 12:
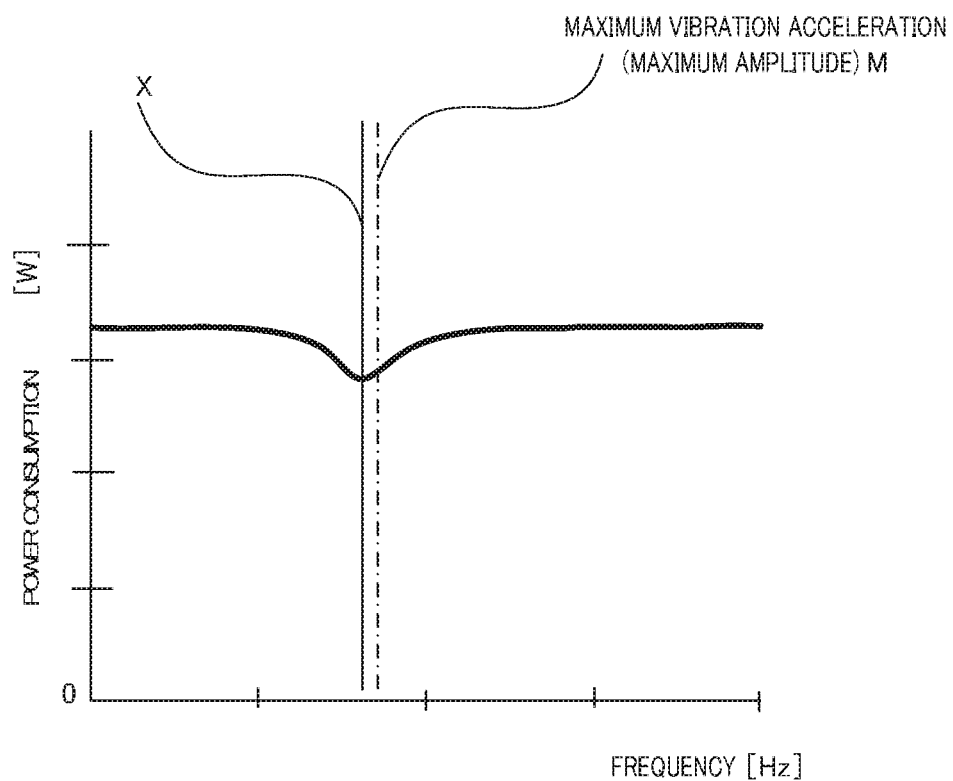
FIG. 12 illustrates a relationship between the driving frequency and a power consumption of the vibration actuator.

FIG. 11 illustrates a relationship between a driving frequency and an amplitude of the vibration actuator, and FIG. 12 illustrates a relationship between the driving frequency and a power consumption of the vibration actuator.

In FIG. 11, the horizontal axis indicates a frequency for driving the vibration actuator, and the vertical axis indicates a vibration amplitude (acceleration of vibration amplitude) corresponding to the driving frequency. In FIG. 12, the horizontal axis indicates the driving frequency for driving the vibration actuator, and the vertical axis indicates the power consumption for driving the vibration actuator at the driving frequency.

As for the driving frequency of the linear resonant actuator as the vibration actuator, it is known that the vibration amplitude is the greatest when the vibration actuator is driven at the resonance frequency (frequency M at which the acceleration of vibration amplitude is maximized), and, when the vibration actuator is driven at a frequency other than the resonance frequency, the vibration is reduced with decreasing amplitude as illustrated in FIG. 11. The power consumption is minimized at frequency X that is a few Hz lower than resonance frequency M as illustrated in FIG. 12.

In the present embodiment, it becomes possible to obtain the greatest vibration by driving the vibration actuators at resonance frequency M. Moreover, when the vibration actuators are driven at frequency X lower than resonance frequency M, it is possible to generate a vibration close to that generated at the resonance frequency by which the greatest vibration is obtained, and to minimize the power consumption so as to achieve the vibration with lower power consumption.

[Vibration of Vibration Apparatus 1]

Figure 13:
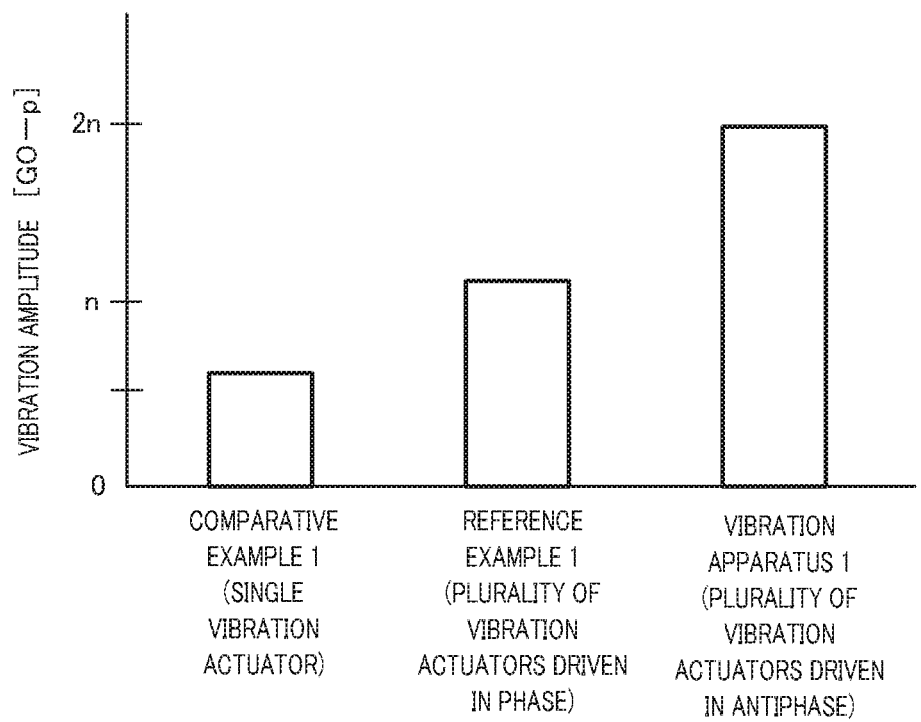
FIG. 13 illustrates a relationship between the number of vibration actuators and the amplitude.
Figure 14:
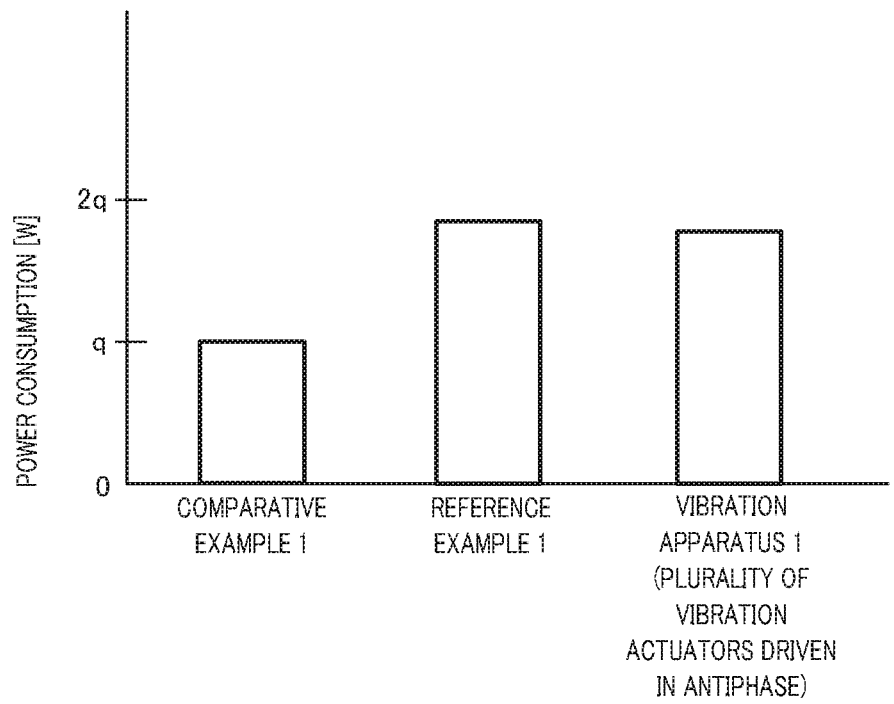
FIG. 14 illustrates a relationship between the number of vibration actuators and the power consumption.
Figure 15:
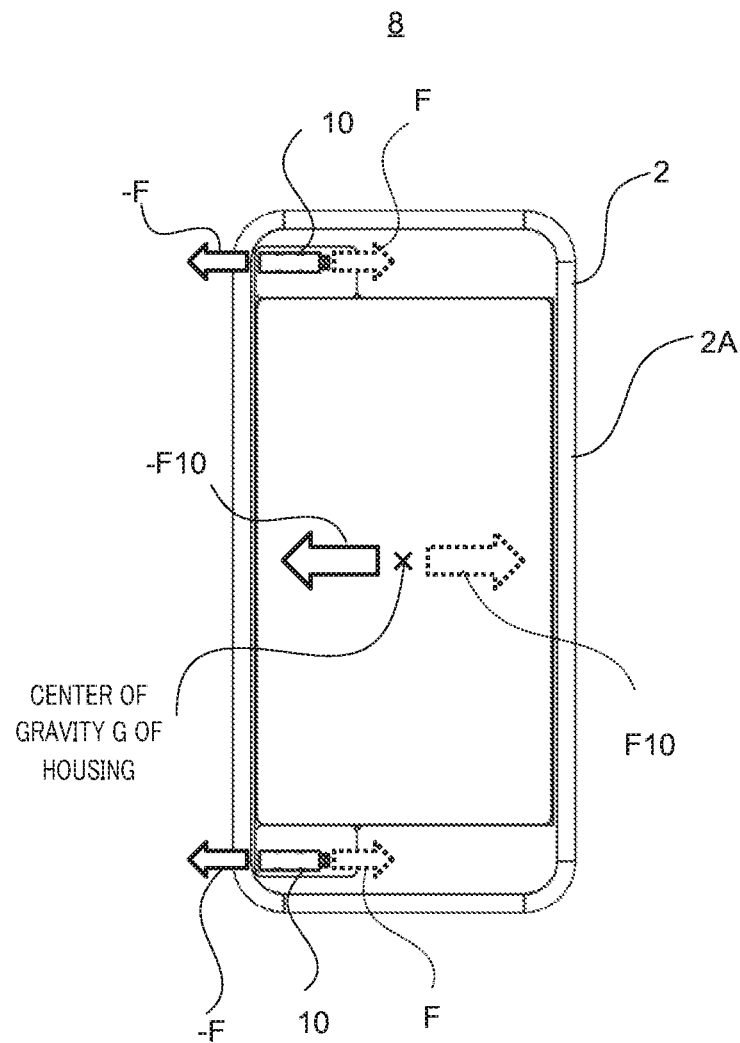
FIG. 15 is a plan view illustrating a configuration of principal parts of a vibration apparatus as a reference example.

FIGS. 13 and 14 illustrate a relationship between the number of vibration actuators and the amplitude and a relationship between the number of vibration actuators and the power consumption, respectively. FIGS. 13 and 14 show results of comparison between the amplitude and the power consumption in vibration apparatus 1 of the present embodiment, the amplitude and the power consumption in comparative example 1 in which a vibration apparatus with the same configuration as vibration apparatus 1 but including one vibration actuator (a vibration apparatus in which only vibration actuator 10-1 is mounted) is used, and the amplitude and the power consumption in reference example 1 in which a vibration apparatus with the same configuration as vibration apparatus 1 and a plurality of vibration actuators driven to move in the same way is used. FIG. 15 illustrates the positions of the vibration actuators disposed in the vibration apparatus of reference example 1.

As illustrated in FIG. 15, a configuration of vibration apparatus 8 the same as that of vibration apparatus 1 but in which vibrations are excited such that vibration actuators 10 vibrate in phase with each other in the vibration direction of vibration actuators 10 is employed for the vibration apparatus of reference example 1. This is based on the supposition that, in an attempt to achieve a greater vibration of an apparatus including a vibration actuator, a plurality of vibration actuators are disposed and are moved in phase with each other in the same direction. Note that, in this configuration, problems such as an increase in cost, an increase in a mounting space on a substrate, and the like may arise depending on a configuration of a drive circuit.

As is clear from FIGS. 13 and 14, the vibration amplitude of vibration apparatus 1 of the present embodiment in which a plurality of vibration actuators are driven in antiphase with each other is more than twice as great as the amplitude of comparative example 1 with a single vibration actuator (approximately four times greater than that of comparative example 1). Moreover, the amplitude of reference example 1 (vibration apparatus 8 illustrated in FIG. 15) in which the vibration actuators vibrate in phase with each other in the identical direction is approximately merely twice as great as that of comparative example 1. In addition, a result that the vibration acceleration of the side surfaces of the housing is greater by a maximum of 71% in vibration apparatus 1 than in reference example 1 has been obtained. Furthermore, the vibration amplitude in vibration apparatus 1 increases by mutually increased vibrations generated by the vibration actuators, so that it is possible to reduce the power consumption. In this respect, an effect of an approximately 5% decrease in power consumption is obtained in vibration apparatus 1 as compared to the power consumption of vibration apparatus 8.

According to the present invention, it is thus possible to give a greater physically-felt vibration preferably without enlarging the vibration actuators.

Moreover, it is efficient that equipment components disposed in housing 2 are disposed conformably to housing 2 in the case of the rectangular housing like housing 2 of the present embodiment from a viewpoint of disposition of the components. When the vibration actuators are disposed in this viewpoint, it is possible to obtain a vibration of the housing rotating around the center of gravity by disposing the vibration actuators on opposite sides of the center of gravity (it does not matter if the vibration actuators are disposed completely linearly).

Embodiment 2

[Entire Configuration of Vibration Apparatus]

Figure 16:
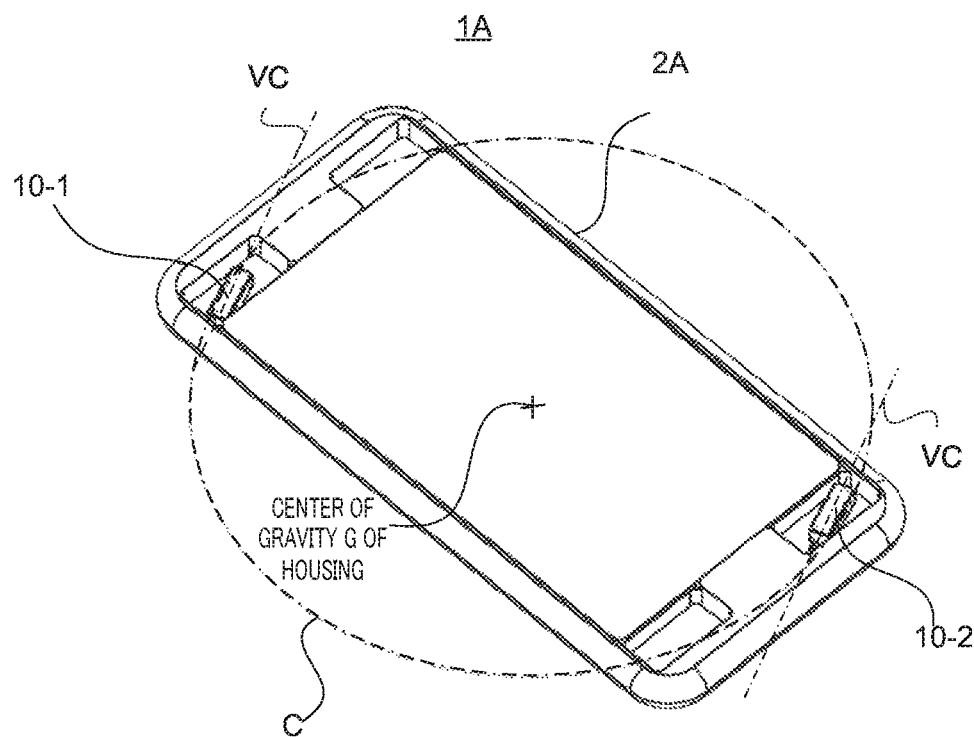
FIG. 16 is a perspective view illustrating principal parts of a vibration apparatus of Embodiment 2 according to the present invention.
Figure 17:
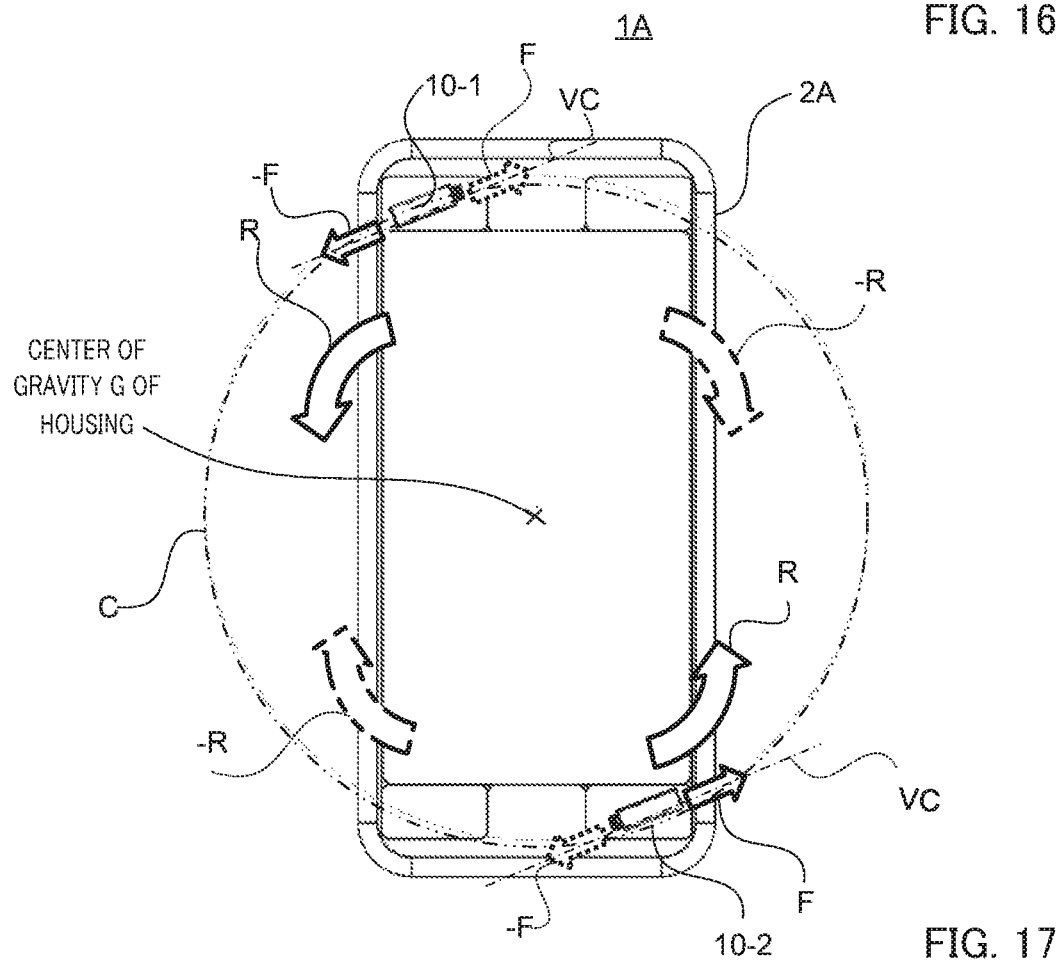
FIG. 17 is a plan view illustrating operation of the vibration apparatus of Embodiment 2.

FIG. 16 is a perspective view illustrating a vibration apparatus of Embodiment 2 according to the present invention, and FIG. 17 is a plan view illustrating operation of the vibration apparatus. Note that, only disposition portions of housing 2A of a mobile terminal at which vibration actuators 10 are disposed are illustrated in FIGS. 16 and 17 to be seen through the outer surface of the housing of the mobile terminal, for convenience.

Vibration apparatus 1A of Embodiment 2 of the present invention is applied to the mobile terminal like vibration apparatus 1, and includes housing 2A of the mobile terminal and a plurality of vibration actuators 10 (10-1 and 10-2) mounted in housing 2A.

A configuration of vibration apparatus 1A of Embodiment 2 is identical to that of vibration apparatus 1 except for a position at which vibration actuators 10-1 and 10-2 are disposed. Accordingly, the same components between vibration apparatus 1A and vibration apparatus 1 are provided with the same reference symbols, and descriptions of such components will be omitted. Note that, although the present embodiment will be described in relation to vibration apparatus 1A applied to the mobile terminal, vibration apparatus 1A may also be applied to any kind of apparatus or device as long as it produces a vibration. For example, vibration apparatus 1A may be applied to a game controller, wearable terminal, laptop PC, tablet terminal, or the like.

In housing 2A, vibration actuators 10-1 and 10-2 are disposed on opposite sides of center of gravity G of housing 2 and in such directions that vibrations are excited in opposite directions (in antiphase) along mutually parallel vibration-axial lines VC running along the vibration direction (here, vibration-axial lines VC are axial lines running along the vibration direction and serving as vibration directions). Specifically, vibration actuators 10-1 and 10-2 are disposed such that vibration-axial lines VC extending along their vibration directions are disposed on or along the tangents of circumference C whose center is center of gravity G of the housing. Although the vibration actuators are disposed at corner portions of housing 2 on the upper let side and on the lower right side in the present embodiment, the present invention is not limited to this embodiment, and the vibration actuators may also be disposed at corner portions of housing 2 on the upper right side and on the lower left side and along the tangents of the circumference. In addition, a plurality of vibration actuators may also be disposed at the corner portions of housing 2 on the upper-left, upper-right, lower-left, and lower-right sides, to vibrate on the identical circumference whose center is center of gravity G.

Note that, it is preferable that center of gravity G of housing 2 be the center of gravity of vibration actuators 10 in which all components including vibration actuators 10-1 and 10-2 are included.

Note that, vibration actuators 10-1 and 10-2 are the same as vibration actuators 10-1 and 10-2 of Embodiment 1, and are so-called Linear Resonant Actuators (LRAs) that cause their movable bodies 30 to linearly move (reciprocate) at a substantially identical resonance frequency. That is, each of vibration actuators 10-1 and 10-2 includes: a fixing body including a coil or a magnet; and a movable body including the other one of the coil and the magnet and being supported elastically by the fixing body. Each of vibration actuators 10-1 and 10-2 drives, by cooperation between the coil and the magnet, the movable body such that the movable body linearly reciprocates with respect to the fixing body at a resonance frequency.

Like in Embodiment 1, vibration actuators 10-1 and 10-2 are driven to linearly reciprocate at the identical resonance frequency or at a substantially identical resonance frequency (frequency X slightly lower than the resonance frequency) such that vibrations are excited in antiphase with each other.

In vibration apparatus 1A, vibrations are excited in the mutually opposite directions (in antiphase with each other) along vibration-axial lines VC (shaft parts 80) of movable bodies 30 (see FIG. 2) of a plurality of vibration actuators 10-1 and 10-2. Such vibrations are caused via driving circuit systems 11A or 11B illustrated in FIG. 8 or 9, for example.

Thus, vibration actuator 10-1 vibrates in the −F direction (e.g., such a vibration corresponds to the movement of movable body 30 in the −F direction as illustrated in FIG. 7), and vibration actuator 10-2 vibrates in the F direction (e.g., such a vibration corresponds to the movement of movable body 30 in the F direction as illustrated in FIG. 7) as illustrated in FIG. 17. Accordingly, a motion of housing 2A itself of moving (vibrating) on one side in the circumferential direction (in the direction indicated by solid-line arrows R) around center of gravity G of housing 2A arises, and housing 2 moves in the direction indicated by arrows R.

When coils 70a and 70b of vibration actuators 10-1 and 10-2 are supplied with reverse electric current via signal generation section 11b and amplifier 11c of drive control section 11a illustrated in FIG. 8 or 9 such that vibration actuators 10-1 and 10-2 vibrate in antiphase with each other, vibrations in the opposite directions are excited in movable bodies 30 (see FIG. 2) and vibration actuators 10-1 and 10-2 vibrate in the mutually opposite directions as described above.

That is, vibration actuator 10-1 moves in the F direction and vibration actuator 10-2 moves in the −F direction. Accordingly, a motion of housing 2A itself of moving (vibrating) on the other side in the circumferential direction (in the direction indicated by dashed-line arrows −R) around center of gravity G of housing 2A arises, and housing 2 moves in the direction indicated by arrows −R. Such vibration direction runs along the circumferential direction, and repetition of these motions causes entire housing 2 of vibration apparatus 1 to reciprocate (vibrate) in the circumferential direction around center of gravity G.

According to this configuration, it is possible to obtain the same effect as in vibration apparatus 1, a plurality of vibration actuators (linear resonant actuators) 10-1 and 10-2 with substantially identical resonance frequencies are disposed such that the circumferential direction of the circumference whose center is center of gravity G serves as a moving direction, and vibration actuators 10-1 and 10-2 are driven in such directions that vibrations are excited on the same side in the circumferential direction with respect to a rotational direction. It is thus possible to efficiently excite the vibrations of housing 2A in the rotational direction.

Embodiment 3

Figure 18:
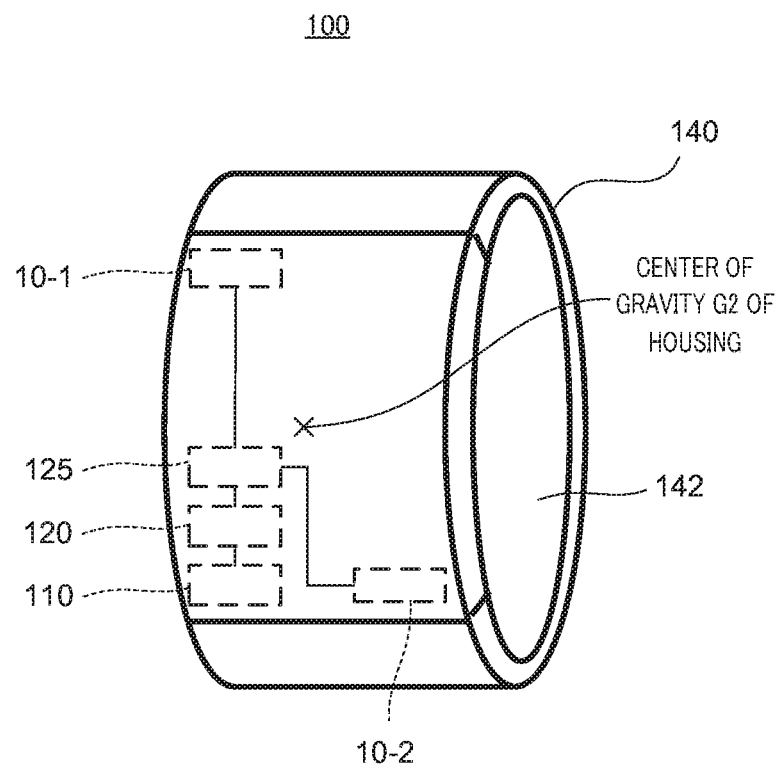
FIG. 18 schematically illustrates a configuration of principal parts of a wearable terminal of Embodiment 3 according to the present invention.
Figure 19:
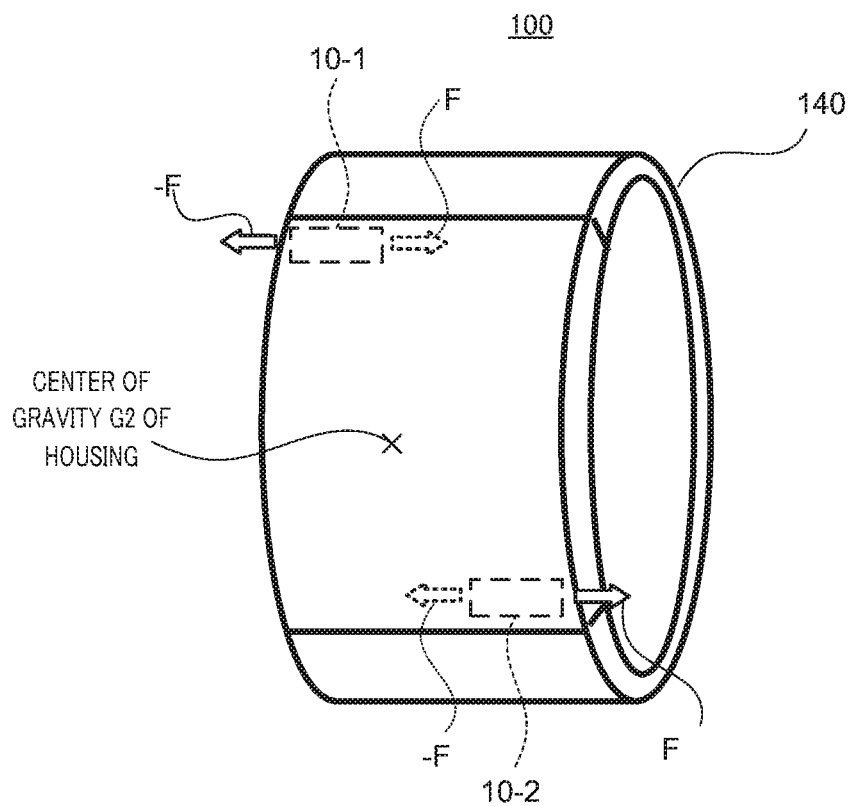
FIG. 19 schematically illustrates operation of the wearable terminal.

FIG. 18 schematically illustrates a configuration of principal parts of wearable terminal 100 of Embodiment 3 according to the present invention, and FIG. 19 schematically illustrates operation of wearable terminal 100. Wearable terminal 100 is worn for use by a user. Here, wearable terminal 100 functions as what is called a wearable input device that vibrates to notify a user wearing wearable terminal 100 of an incoming call of a communication terminal connected to wearable terminal 100.

Vibration apparatus 1 or 1A described in Embodiment 1 or 2 is applied to wearable terminal 100 illustrated in FIG. 18. Wearable terminal 100 includes vibration apparatus 1 or 1A, and includes main body housing 140 as a mounting housing, communication device 110, processor 120, driving circuit section 125, and vibration actuators 10-1 and 10-2 connected to driving circuit section 125 via power supplying parts (power supplying parts 25 of vibration actuators 10).

Main body housing 140 is ring shaped and, here, is worn on the user's finger. In this respect, vibration actuators 10-1 and 10-2 are disposed such that their bottom surfaces are located to overlap the pad of the finger on which wearable terminal 100 is put. Vibration actuators 10-1 and 10-2 are thus put on to make a close contact with a part in which mechanoreceptors are concentrated. Communication device 110 is connected by radio communication to a radio communication terminal which is not illustrated, such as a mobile phone, a smartphone, a portable game machine, or the like, and receives a signal from the radio communication terminal and outputs it to processor 120.

A plurality of vibration actuators 10-1 and 10-2 vibrate at a substantially identical resonance frequency, and are disposed such that vibration-axial lines VC extending along the vibration directions of movable bodies 30 of vibration actuators 10-1 and 10-2 are parallel to each other and center of gravity G2 of main body housing 140 is located between vibration-axial lines VC, and are disposed in such directions that their movable bodies 30 reciprocating along vibration-axial lines VC excite vibrations in mutually opposite directions (in antiphase with each other). Vibration actuators 10-1 and 10-2 are disposed such that their bottom surfaces are close to inner circumferential surface 142 of main body housing 140.

As for communication device 110, examples of signals from the radio communication terminal include an incoming call signal or the like of the radio communication terminal to be received through a communication system, such as Bluetooth (registered trademark), for example. Processor 120 and driving circuit section 125 correspond to drive control section 11a in driving circuit system 11A or 11B of vibration apparatus 1 or 1A. That is, processor 120 has the same functions as drive control section 11a. Processor 120 converts an input signal into a driving signal for vibration actuators 10-1 and 10-2 in a conversion circuit section, outputs the driving signal to driving circuit section 125, and supplies the driving signal to vibration actuators 10-1 and 10-2 via driving circuit section 125, so as to drive vibration actuators 10-1 and 10-2.

Main body housing 140 of wearable terminal 100 is ring shaped, and movable bodies 30 vibrate back and forth along the bottom surfaces of vibration actuators 10-1 and 10-2 (corresponding to the bottom surfaces of cases 21). Accordingly, repetition of reciprocation in the F and –F directions caused by movable bodies 30 performing reciprocating sliding movements in antiphase with each other in parallel vibration directions causes main body housing 140 to vibrate back and forth in the circumferential direction around center of gravity G2. It is possible to obtain the same effects as in Embodiments 1 and 2, and it is possible to give an even greater physically-felt vibration to a user without changing the external shape of a predetermined size.

Moreover, the miniaturization of vibration actuators 10-1 and 10-2 allows miniaturization of the shape of vibration apparatus 1 itself, that is, of wearable terminal 100, so that no uncomfortable feeling is caused during use and it is possible to improve a feeling of use. Note that, wearable terminal 100 may also be an incoming call notification device including communication device 110, processor 120, and vibration actuators 10-1 and 10-2 as a driving device. In this respect, the incoming call notification device may be configured to drive the vibration actuators to notify a user of an incoming call externally obtained by a radio communication terminal, such as a mobile phone, a smartphone, a portable game machine, or the like. In addition, vibration actuators 10-1 and 10-2 can give a vibration to the user not only as the incoming call signal but also as an increased physically-felt vibration of a vibration corresponding to a signal input such as a mail from an external apparatus to an information communication terminal or a vibration corresponding to gaming operation. Note that, this wearable terminal 100 may also be provided with a function that only moving wearable terminal 100 in a way of writing a character in the air allows an input of a character and/or a number to a wirelessly connected apparatus, or allows to select a piece of information displayed on a connected displaying device such as a connected display.

As for a positional relationship of the vibration actuators in the housing in each of the embodiments, the directions of the vibrations of the vibration actuators driven in antiphase with each other, which vibration actuators are disposed with the center of gravity of the housing being interposed therebetween, are such directions of reciprocation of the housing in the circumferential direction around the center of gravity.

Note that, actuators 10 of vibration apparatus 1 or 1A of Embodiment 1 or 2 may also have a configuration in which coils 70a and 70b and E-shaped cores 50a and 50b are disposed in movable bodies 30, and magnets 60a and 60b are disposed in fixing body 20. Note that, a relationship between these magnets and the E-shaped cores or cores around which the coils are respectively wound is the same in each of the embodiments.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof. The embodiments of the invention have been described above. The above description is an illustration of the preferred embodiment of the present invention, and the scope of the present invention is not limited to the description. That is, the description for the construction of the above-mentioned device and for the shape of each part is an example, and it is clear that various modifications and additions to the example can be made within the scope of the present invention.

The disclosure of Japanese Patent Application No. 2017-013600 dated Jan. 27, 2017 including the specification, drawings and abstract is incorporated herein by reference in its entirety.

INDUSTRIAL APPLICABILITY

The vibration actuator according to the present invention can be miniaturized, has effects that it is excellent in assemblability and durability and preferably vibrates even when miniaturized and formed in a flat shape, and is useful for a wearable terminal capable of communicating with an information communication terminal, and for an incoming call notification device that gives a physical feeling to a user for incoming call notification of the information communication terminal such as a mobile phone or the like.

REFERENCE SIGNS LIST

1, 1A, 8 Vibration apparatus
2, 2A, 140 Housing
10, 10-1, 10-2 Vibration actuator
20 Fixing body
30 Movable body
60, 60a, 60b Magnet
70a, 70b Coil
80 Shaft part
82a, 82b Bearing
100 Wearable terminal
110 Communication apparatus
11A, 11B Driving circuit system
120 Processor
125 Driving circuit section
G, G2 Center of gravity

What is claimed is:

1. A vibration apparatus, comprising a vibration actuator that is capable of linearly vibrating a movable body supported elastically by a fixing body, the movable body being linearly vibrated with respect to the fixing body at a resonance frequency, wherein:
the vibration apparatus includes a mounting housing in which a plurality of the vibration actuators are mounted on a plurality of corner portions, and
the plurality of vibration actuators vibrate at a substantially identical resonance frequency, and are disposed such that vibration-axial lines extending along vibration directions of a plurality of the movable bodies of the plurality of vibration actuators are parallel to each other and are arranged on opposite sides of a center of gravity of the mounting housing, the plurality of vibration actuators being disposed in such directions that vibrations are excited in mutually opposite directions along the vibration-axial lines.

2. The vibration apparatus according to claim 1, wherein:
the plurality of vibration actuators are disposed on opposite sides of the center of gravity and such that the vibration-axial lines are disposed on or along tangents of a circumference whose center is the center of gravity, and
the plurality of vibration actuators are driven in such directions that the vibrations are excited in the same circumferential direction of the circumference.

3. The vibration apparatus according to claim 1, wherein the plurality of vibration actuators are connected in parallel or in series and are driven at the substantially identical resonance frequency in a drive circuit for driving the plurality of vibration actuators.

4. An incoming call notification device, comprising the vibration apparatus according to claim 1, wherein the mounting housing is a main body housing.

5. A wearable terminal, comprising the vibration apparatus according to claim 1, wherein the mounting housing is a main body housing.

6. The vibration apparatus according to claim 1, wherein the plurality of vibration actuators vibrate at a frequency where less power is consumed than at the resonance frequency.

7. The vibration apparatus according to claim 1, wherein the plurality of vibration actuators are disposed on at least one of an upper left side and an upper right side of the mounting housing and at least one of a lower left side and a lower right side of the mounting housing.

8. The vibration apparatus according to claim 1, wherein the plurality of vibration actuators are disposed along a side constituting an outer shape of the mounting housing.

9. The vibration apparatus according to claim 1, wherein the plurality of vibration actuators are disposed diagonally with a center of gravity of the mounting housing interposed therebetween.

10. The vibration apparatus according to claim 9, wherein the plurality of vibration actuators are disposed in a direction non-parallel to a side constituting an outer shape of the mounting housing.

11. The vibration apparatus according to claim 1, wherein the mounting housing has a curved shape.

* * * * *